United States Patent
Guo et al.

(10) Patent No.: US 12,553,794 B2
(45) Date of Patent: Feb. 17, 2026

(54) MEASURING DEVICE AND MEASURING METHOD FOR SHAFT-HOLDING FORCE OF SEAL

(71) Applicant: Tsinghua University, Beijing (CN)

(72) Inventors: Fei Guo, Beijing (CN); Fan Zhang, Beijing (CN); Chong Xiang, Beijing (CN); Yijie Huang, Beijing (CN); Ganlin Cheng, Beijing (CN); Yajie Wan, Beijing (CN); Xiaohong Jia, Beijing (CN)

(73) Assignee: Tsinghua University, Beijing (CN)

( * ) Notice: Subject to any disclaimer, the term of this patent is extended or adjusted under 35 U.S.C. 154(b) by 327 days.

(21) Appl. No.: 18/332,212

(22) Filed: Jun. 9, 2023

(65) Prior Publication Data
US 2024/0201047 A1 Jun. 20, 2024

(30) Foreign Application Priority Data
Dec. 15, 2022 (CN) .......................... 202211620110.9

(51) Int. Cl.
*G01M 13/005* (2019.01)

(52) U.S. Cl.
CPC ................ *G01M 13/005* (2013.01)

(58) Field of Classification Search
CPC .................................. G01M 13/005
USPC ...................................... 73/865.8
See application file for complete search history.

(56) References Cited

FOREIGN PATENT DOCUMENTS

| CN | 203365033 U | 12/2013 | | |
|----|-------------|---------|---|---|
| CN | 205506294 U | 8/2016  | | |
| CN | 205879423 U | 1/2017  | | |
| CN | 106644421 A | * 5/2017 | ............ | G01M 13/00 |
| CN | 111397880 A | * 7/2020 | ............ | G01L 5/00 |
| DE | 102012206655 A1 | 10/2013 | | |
| GB | 940866 A | 11/1963 | | |

OTHER PUBLICATIONS

Meng et al. Machine Translation of CN-106644421-A. Published May 2017. Accessed Jun. 2025. (Year: 2017).*
Yang et al. Machine Translation of CN-111397880-A. Published Jul. 2020. Accessed Jun. 2025. (Year: 2020).*
(Continued)

*Primary Examiner* — Walter L Lindsay, Jr.
*Assistant Examiner* — Philip T Fadul
(74) *Attorney, Agent, or Firm* — Tucker Ellis LLP

(57) ABSTRACT

The present disclosure provides a measuring device and measuring method for a shaft-holding force of a seal, relating to the technical field of sealing. The measuring device of a shaft-holding force of a seal includes a driving assembly, a first pressing plate, a pressure sensor, an adiabatic rod, a conical shaft, a first support, a second support, a test box and a seal, a working temperature of the seal may be simulated by the test box, the conical shaft is located inside the test box, the pressure sensor is located outside the test box, the adiabatic rod is connected between the pressure sensor and the conical shaft, and the pressure sensor and the conical shaft are in different environments. Through separating the pressure sensor from the test box by the adiabatic rod, a temperature of the test box will not affect the pressure sensor.

20 Claims, 4 Drawing Sheets

(56) References Cited

OTHER PUBLICATIONS

First Office Action of corresponding Chinese Application No. 202211620110.9, dated Mar. 6, 2024, 16 pages.
Guo Fei et al., Experimental Study on High Temperature and High Pressure Sealing Performance of Packer Rubber, Lubrication Engineering, vol. 45, No. 7, Jul. 15, 2020, 5 pages.
Guo Fei et al., "Simulation of Pre-tightening Process of Non-circular Metal O-ring Assembly", Lubrication Engineering, vol. 45, No. 10, Oct. 15, 2020, 6 pages.

\* cited by examiner

MEASURING DEVICE AND MEASURING METHOD FOR SHAFT-HOLDING FORCE OF SEAL

CROSS-REFERENCE TO RELATED APPLICATION

This application claims priority to Chinese Patent Application No. 202211620110.9, filed on Dec. 15, 2022, which is hereby incorporated by reference in its entirety.

TECHNICAL FIELD

The present disclosure relates to the technical field of sealing, in particular to a measuring device and a measuring method for a shaft-holding force of a seal.

BACKGROUND

Seals are important structures to ensure normal operation of mechanical equipment, and are mainly used to prevent fluid leakage, which can save materials, save energy consumption and reduce costs. With the rapid development of modern industry, mechanical equipment has put forward increasingly stringent requirements for reliability and service life of the seals. Therefore, it is very important to conduct in-depth researches on service performance of the seals under complex working conditions. During the use of the seals, their sealing performance and leakage rate under service conditions are directly related to contact pressure at the sealing interface. Since the contact pressure of the seals in a circumferential direction is difficult to be measured directly, at present, the value of the contact pressure is generally determined indirectly by measuring the shaft-holding force.

In related arts, measurement of the shaft-holding force of a seal is mainly a half-shaft method, where two separate half-shafts are used to replace an actual shaft, and a force-measuring sensor is added between the two half-shafts, and after the seal is assembled into a measuring device composed of the two half-shafts and the force-measuring sensor, the shaft-holding force is obtained through the force-measuring sensor.

However, since the force-measuring sensor is directly installed between the two half-shafts, and thus the force-measuring sensor and the two half-shafts are in the same environment, there are cases that the shaft-holding force of the seal working under high or low temperature working conditions cannot be measured due to the limitation of use temperature conditions of the force-measuring sensor.

SUMMARY

The present disclosure provides a measuring device and a measuring method for a shaft-holding force of a seal, to solve the problem that since the force-measuring sensor is directly installed between two half-shafts and thus the force-measuring sensor and the two half-shafts are in the same environment, the shaft-holding force of a seal that works under high or low temperature conditions cannot be measured due to the limitation of use temperature conditions of the force-measuring sensor.

On one aspect, the present disclosure provides a measuring device for a shaft-holding force of a seal, including a driving assembly, a first pressing plate, a pressure sensor, an adiabatic rod, a conical shaft, a first support, a second support, a test box and a seal;

the first support is fixed to the second support, the second support is fixed to the test box, the test box includes a test chamber, the conical shaft and the seal are located in the test box, the seal is set on the test chamber, the seal is in contact with an inner wall of the test box, the pressure sensor is located outside the test box, the adiabatic rod slidably passes through the second support, and the pressure sensor and the conical shaft are respectively fixed at two ends of the adiabatic rod;

the drive assembly is installed to the first support, the drive assembly is fixedly connected with the first pressing plate, the first pressing plate is fixedly connected with the pressure sensor, and the drive assembly is used to move the first pressing plate, the pressure sensor, the adiabatic rod and the conical shaft along a first direction, and the conical shaft is used to compress an interference amount of the seal to a preset interference amount during movement in the first direction.

Optionally, the conical shaft includes a large diameter end and a small diameter end, and the large diameter end is fixedly connected with the adiabatic rod.

Optionally, the adiabatic rod includes a connection seat and a second pressing plate, the connection seat and the second pressing plate are detachably connected to each other, the connection seat is connected with the pressure sensor, and the second pressing plate is fixedly connected with the large diameter end of the conical shaft.

Optionally, the second support is provided with a first cylindrical hole, a second cylindrical hole and a third cylindrical hole arranged in sequence along the first direction, a diameter of the first cylindrical hole is greater than a diameter of the second cylindrical hole, and a diameter of the third cylindrical hole is greater than the diameter of the second cylindrical hole;

the test box is provided with a cylindrical through hole, a diameter of the cylindrical through hole is greater than a diameter of the large diameter end of the conical shaft and the diameter of the third cylindrical hole;

the pressure sensor is located in the first cylindrical hole, the connection seat passes through the second cylindrical hole, and the second pressing plate is located in the third cylindrical hole.

Optionally, the connection seat includes a connection plate and a guide post, the connection plate and the guide post are fixedly connected, the connection plate is fixedly connected with the pressure sensor, the connection plate is located in the first cylindrical hole, and the guide post is slidably arranged in the second cylindrical hole;

a first step is provided in the first cylindrical hole, a second step is provided in the third cylindrical hole, the connection plate can abut against the first step, and the second pressing plate abuts against the second step.

Optionally, the driving assembly includes a hand wheel and a lead screw, the lead screw passes through the first support, the hand wheel and the first pressing plate are fixed at two ends of the lead screw respectively, and the lead screw extends along the first direction.

Optionally, the first support is provided with a threaded hole matching with the lead screw.

Optionally, the seal is a circular seal, the seal has a first diameter when the interference amount of the seal is zero, and the seal has a second diameter when the interference amount of the seal is the preset interference amount.

Optionally, the test chamber is internally provided with a high-temperature fluid medium or a low-temperature fluid medium.

On another aspect, the present disclosure provide a measuring method for a shaft-holding force of a seal using the measuring device for the shaft-holding force of the seal as described above, including:

simulating, by the test box, a working temperature of the seal;

placing the seal and conical shaft into the test chamber, where the seal is not in contact with the conical shaft, and the interference amount of the seal is zero;

moving, by the driving assembly, the first pressing plate, the pressure sensor, the adiabatic rod and the conical shaft in the first direction, and compressing, by the conical shaft, the interference amount of the seal to the preset interference amount;

obtaining, by the pressure sensor, a pressure value when the interference amount of the seal is the preset interference amount.

The present disclosure provides a measuring device and measuring method for a shaft-holding force of a seal, where the measuring device for the shaft-holding force of the seal includes a drive assembly, a first pressure plate, a pressure sensor, an adiabatic rod, a conical shaft, a first support, a second support, a test box and a seal, the working temperature of the seal may be simulated by the test box, the conical shaft is located inside the test box, the pressure sensor is located outside the test box, the adiabatic rod is connected between the pressure sensor and the conical shaft, the pressure sensor and the conical shaft are in different environments and the pressure sensor is separated from the test box by the adiabatic rod so that the temperature of the test box does not affect the pressure sensor, and thus the shaft-holding force of the seal may be measured at high or low working temperatures.

BRIEF DESCRIPTION OF DRAWINGS

In order to more clearly explain technical solutions in embodiments of the present disclosure or in the prior art, the following will briefly introduce drawings needed in description of the embodiments or the prior art. It is obvious that the drawings in the following description are some embodiments of the present disclosure. For those skilled in the art, other drawings can also be obtained from these drawings without paying creative labor.

Figure 1:
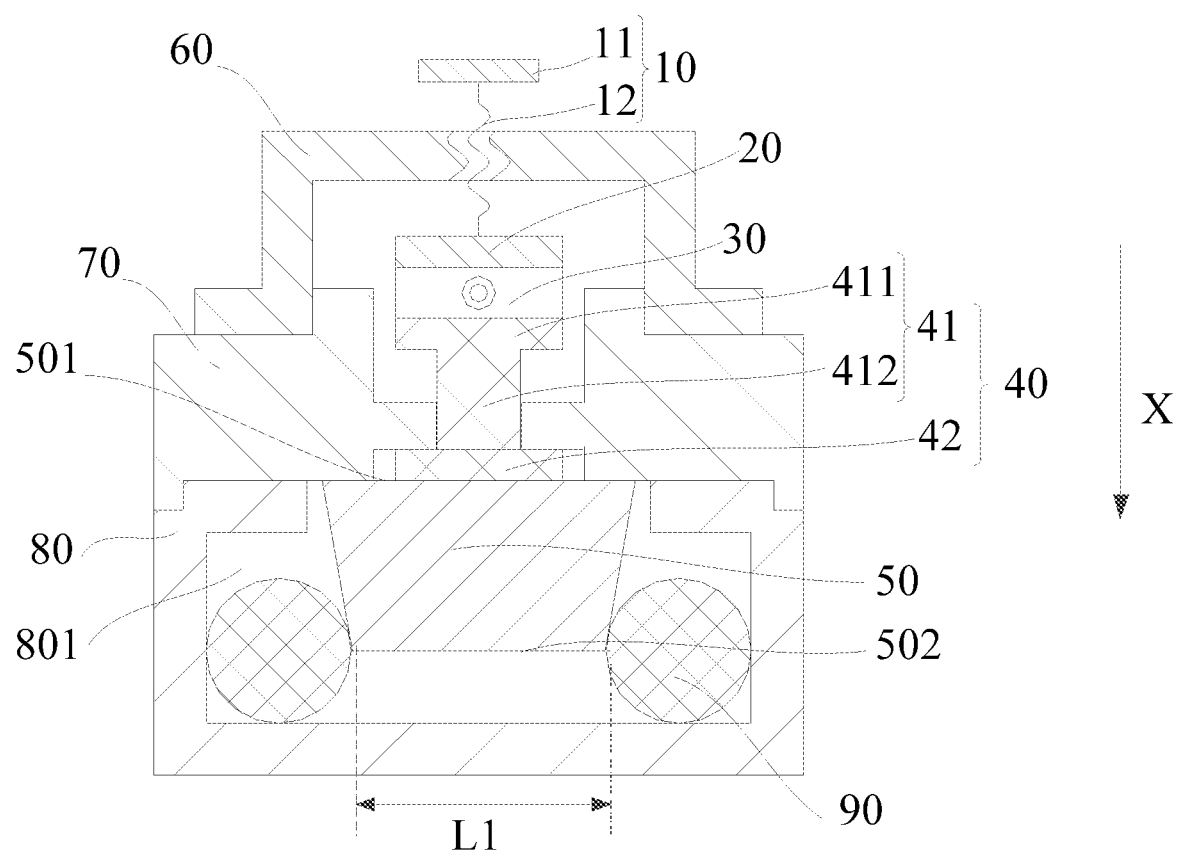
FIG. 1 is schematic structural diagram I of a measuring device for a shaft-holding force of a seal according to an embodiment of the present disclosure.

Description of reference numbers:

| | |
|---|---|
| 10 - drive assembly; | 11 - hand wheel; |
| 12 - lead screw; | 20 - first pressing plate; |
| 30 - pressure sensor; | 40 - adiabatic rod; |
| 41 - connection seat; | 411 - connection plate; |
| 412 - guide post; | 42 - second pressing plate; |
| 50 - conical shaft; | 501 - large diameter end; |
| 502 - small diameter end; | 60 - first support; |
| 70 - second support; | 701 - first cylindrical hole; |
| 702 - second cylindrical hole; | 703 - third cylindrical; |
| 80 - test box; | 801 - test chamber; |

-continued

Description of reference numbers:

| | |
|---|---|
| 802 - cylindrical through hole; | 90 - seal; |
| 601 - threaded hole. | |

DESCRIPTION OF EMBODIMENTS

In order to make objects, technical solutions and advantages of the embodiments of the present disclosure more clear, the technical solutions in the embodiments of the present disclosure will be described clearly and completely in combination with the drawings of the embodiments of the present disclosure. Obviously, the described embodiments are part of the embodiments of the present disclosure, not all of the embodiments. Based on the embodiments in the present disclosure, all other embodiments obtained by those skilled in the art without creative work fall within scope of protection of the present disclosure.

It should be noted that terms "first" and "second" are only used for purpose of description, and cannot be understood as indicating or implying relative importance or implying the number of technical features indicated. Therefore, the features defined as "first" and "second" can include at least one of these features explicitly or implicitly. In the description of the present disclosure, "a plurality of" means at least two, such as two, three, etc., unless otherwise specifically defined.

In the present disclosure, unless otherwise specified and defined, terms "install", "connect", "fix" and the like should be understood in a broad sense. For example, they may refer to fixed connection, detachable connection, or integrated connection; they may refer to mechanical connection, electrical connection or mutual communication connection; they may refer to direct connection, or indirect connection through an intermediate medium; and they may refer to internal communication between two components or mutual interaction between two components, unless otherwise specified. For those skilled in the art, specific meanings of the above terms in the present disclosure may be understood according to specific situations.

In the present disclosure, unless otherwise clearly specified and defined, the first feature being "above" or "below" the second feature may be that the first feature is directly contacted with the second feature, or that the first feature is indirectly contacted with the second through an intermediate medium. Moreover, the first feature being "above", "on" and "over" the second feature may be that the first feature is directly or diagonally above, on or over the second feature, or merely means that a horizontal height of the first feature is greater than that of the second feature. The first feature being "below", "under" and "underneath" the second feature may be that the first feature is directly or diagonally below, under or underneath the second feature, or merely means that a horizontal height of the first feature is less than that of the second feature.

In the above descriptions, the descriptions with reference to terms "one embodiment", "some embodiments", "examples", "specific examples", or "some examples" means that specific features, structures, materials, or characteristics described in connection with the embodiment(s) or example(s) are included in at least one embodiment or one example of the present disclosure. In the present specification, schematic expressions of the above terms are not necessarily for the same embodiment or example. Further-more, the specific features, structures, materials or characteristics described may be combined in an appropriate manner in any one or more embodiments or examples. In addition, without contradiction, those skilled in the art may combine and group different embodiments or examples and features of the different embodiments or examples described in the present specification.

In related arts, measurement of shaft-holding force of a seal is mainly through a half-shaft method, which uses two separate half-shafts to replace a shaft with an actual corresponding size, and adds a force-measuring sensor between the two half-shafts, and after the seal is assembled to a measuring device including the two half-shafts and the force-measuring sensor, the shaft-holding force is obtained through the force-measuring sensor. However, since the force-measuring sensor is directly installed between the two half-shafts, and thus the force-measuring sensor and the two half-shafts are in the same environment, it is not possible to measure the shaft-holding of the seal under high or low temperature operating conditions due to the limitation of use temperature of the force-measuring sensor. For example, it is the case for a seal working in liquid hydrogen or liquid oxygen environment, or a seal working in oil wells.

In order to solve the above problem, the present disclosure provides a measuring device and a measuring method for a shaft-holding force of a seal, providing a test box, a pressure sensor, a conical shaft, an adiabatic rod and a seal, where the pressure sensor is located outside the test box, the conical shaft and the seal are located inside the test box, and the adiabatic rod is connected between the pressure sensor and the conical shaft, the test box may simulate a working temperature of the seal, the adiabatic rod may separate the pressure sensor from the test box, so that the temperature of the test box will not affect the pressure sensor, and thus the shaft-holding force of the seal under high or low temperature working conditions can be measured.

The measuring device of the shaft-holding force of the seal provided by embodiments of the present disclosure will be described below in detail in combination with specific embodiments.

Figure 2:
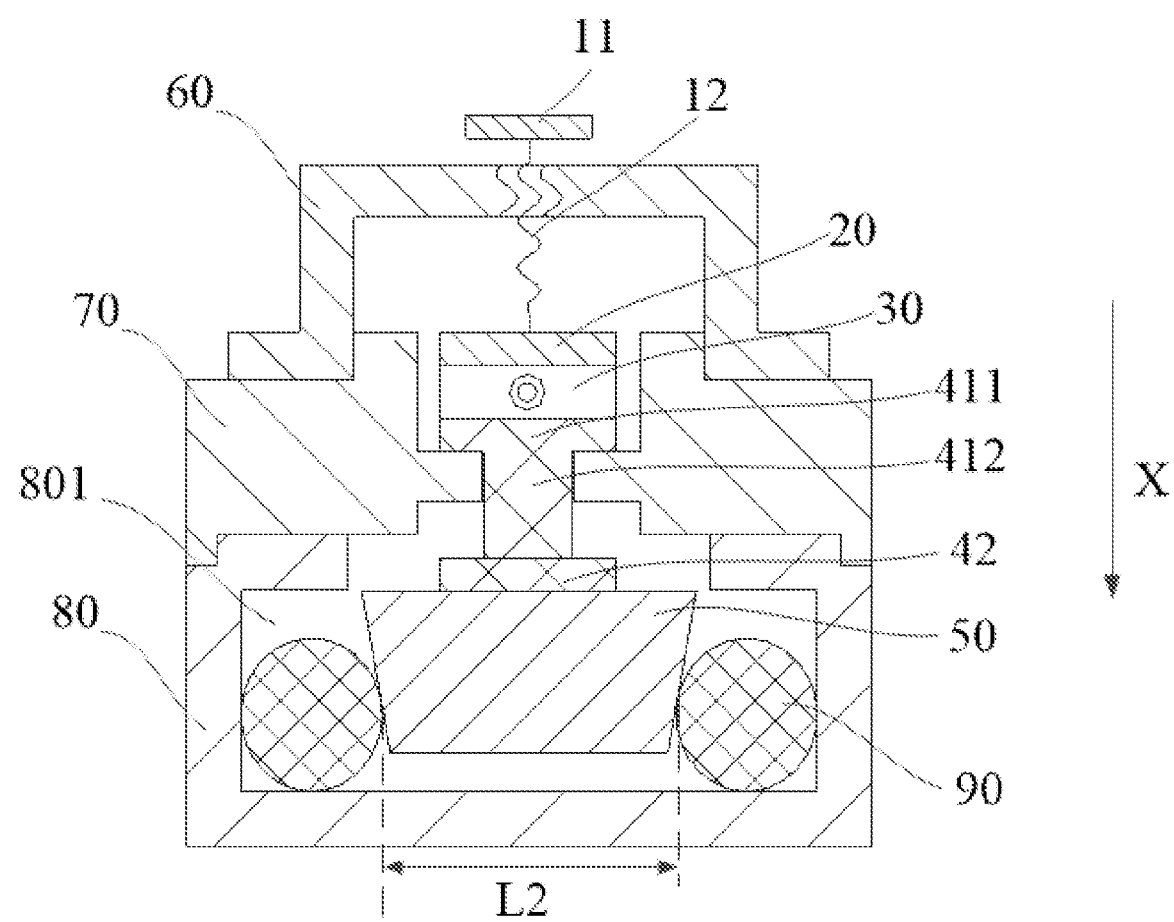
FIG. 2 is schematic structural diagram II of the measuring device for the shaft-holding force of the seal in FIG. 1.

FIG. 1 is schematic structural diagram I of a measuring device for a shaft-holding force of a seal according to an embodiment of the present disclosure; FIG. 2 is schematic structural diagram II of the measuring device of the shaft-holding force of the seal in FIG. 1.

As shown in FIG. 1 and FIG. 2, the embodiment of the present disclosure provides a measuring device for a shaft-holding force of a seal, including a drive assembly 10, a first pressing plate 20, a pressure sensor 30, an adiabatic rod 40, a conical shaft 50, a first support 60, a second support 70, a test box 80 and a seal 90.

The first support 60 is fixed on the second support 70, the second support 70 is fixed on the test box 80, the test box 80 includes a test chamber 801, the conical shaft 50 and the seal 90 are located in the test box 80, the seal 90 is provided on the test chamber 801, the seal 90 is in contact with an inner wall of the test box 80, the pressure sensor 30 is located outside the test box 80, the adiabatic rod 40 may slidably pass through the second support 70, and the pressure sensor 30 and the conical shaft 50 are respectively fixed on two ends of the adiabatic rod 40.

The drive assembly 10 is installed on the first support 60, the drive assembly 10 is fixedly connected with the first pressing plate 20, the first pressing plate 20 is fixedly connected with the pressure sensor 30, the drive assembly 10 is used to move the first pressing plate 20, the pressure sensor 30, the adiabatic rod 40 and the conical shaft 50 along a first direction X, and the conical shaft 50 is used to compress an interference amount of the seal 90 to a preset interference amount during the movement along the first direction X.

Where, the first support 60, the second support 70 and the test box 80 are all rotational bodies. The first support 60 and the second support 70 may be detachable from each other, the second support 70 and the test box 80 may be detachable from each other, the first support 60 and the second support 70 may be fixed between each other by a bolt, and the second support 70 and the test box 80 may be fixed between each other by a bolt.

A shape of the test chamber 801 is cylindrical. As shown in FIG. 1, the test box 80 may simulate a working temperature of the seal 90, that is, a temperature of the test chamber 801 may be equal to the working temperature of the seal 90.

In an optional implementation, when the seal 90 is applied in liquid hydrogen or liquid oxygen environment, the temperatures of the liquid hydrogen or liquid oxygen may be simulated by cooling the test box 80, thereby forming the working temperature of the seal 90.

In another optional implementation, when the seal 90 is applied in an oil well, the temperature of the oil well may be simulated by heating the test box 80, thereby forming the working temperature of the seal 90.

The seal 90 is a circular seal. The seal 90 may be one of an O-shaped ring, a lip seal, a Stepseal, a Glyd ring, a Veriseal, and the like.

The seal 90 is in contact with the inner wall of the test box 80, and there is a pressing force between the seal 90 and the inner wall of the test box 80, and thus there is friction force between the seal 90 and the test box 80. The seal 90 is fixed to the inner wall of the test box 80 under an action of the friction force.

The adiabatic rod 40 is made of a thermal insulation material, and the adiabatic rod 40 is a rotational body. The material of the adiabatic rod 40 may be a material with low thermal conductivity and high rigidity, including but not limited to glass fiber filled PEEK (poly(ether-ether-ketone)), PE (polyethylene) and other materials. The adiabatic rod 40 and the second support 70 may close the test chamber 801.

The drive assembly 10 is a structure that can realize a controllable displacement of the conical shaft 50 in a first direction X. For example, the drive assembly 10 can be a lead screw mechanism, a linear motor, or a grating rack.

It should be noted that the drive assembly 10 not only moves the first pressing plate 20, the pressure sensor 30, the adiabatic rod 40 and the conical shaft 50 in the first direction X, but also moves the first pressing plate 20, the pressure sensor 30, the adiabatic rod 40 and the conical shaft 50 in a direction opposite to the first direction X.

The drive assembly 10 may drive the first pressing plate 20 to move in the first direction X, the first pressing plate 20 may drive the pressure sensor 30 to move in the first direction X, the pressure sensor 30 may drive the adiabatic rod 40 to move in the first direction X, and the adiabatic rod 40 may drive the conical shaft 50 to move in the first direction X.

It should be noted that the drive assembly 10 may support the first pressing plate 20, the pressure sensor 30, the adiabatic rod 40 and the conical shaft 50 in the first direction X.

The conical shaft 50 is a rotational body, the conical shaft 50 has a cone angle, and an axial direction of the conical shaft 50 extends along the first direction X. In the measuring device of the shaft-holding force of the seal, different cone angles and the conical shafts 50 with different axial lengths can be replaced.

The conical shaft 50 is not in contact with the seal 90 before measuring the shaft-holding force of the seal 90.

Specifically, before measuring the shaft-holding force of the seal 90, by supporting the first pressing plate 20, the pressure sensor 30, the adiabatic rod 40 and the conical shaft 50 via the drive assembly 10, the conical shaft 50 is not in contact with the seal 90. At this time, the interference amount of the seal 90 is zero, a diameter of the seal 90 is a first diameter L1, and a pressure value of the pressure sensor 30 is a first pressure value.

When measuring the shaft-holding force of the seal 90, first, the drive assembly 10 drives the first pressing plate 20, the pressure sensor 30, the adiabatic rod 40 and the conical shaft 50 to move along the first direction X, and the conical shaft 50 is in contact with the seal 90 during the movement, and at this time, as shown in FIG. 1, the interference amount of the seal 90 is zero, the diameter of the seal 90 is the first diameter, and the pressure value of the pressure sensor 30 is the first pressure value; then, the conical shaft 50 continues to move, and the conical shaft 50 compresses the seal 90, and when the interference amount of the seal 90 is a preset interference, the conical shaft 50 stops moving, and at this time, as shown in FIG. 2, the conical shaft 50 is not in contact with the test chamber 801, the interference amount of the seal 90 is the preset interference amount, the diameter of the seal 90 is a second diameter L2, and the pressure value of the pressure sensor 30 is a second pressure value.

It should be noted that the first diameter L1 of the seal 90 may be the inner diameter of the seal 90 when the seal 90 is at working temperature and not installed to a mechanical apparatus; the second diameter L2 of the seal 90 may be the inner diameter of the seal 90 when the seal 90 is at working temperature and installed to the mechanical apparatus; the preset interference amount may be a difference between the second diameter L2 and the first diameter L1 of the seal 90.

As shown in FIG. 1, when the conical shaft 50 is in contact with the seal 90 and the interference amount of the seal 90 is zero, a diameter of the conical shaft 50 at a contact position with the seal 90 equals to the first diameter L1; as shown in FIG. 2, when the conical shaft 50 is in contact with the seal 90 and the interference amount of the seal 90 is the preset interference amount, a diameter of the conical shaft 50 at a contact position with the seal 90 equals to the second diameter L2, and a distance between the position of the first diameter L1 and the position of the second diameter of the conical shaft 50 in the first direction X is a first distance. The conical shaft 50 compressing the interference amount of the seal 90 to the preset interference amount may be achieved by moving the conical shaft 50 for the first distance along the first direction X when the conical shaft 50 contacts the seal 90 and the interference amount of the seal 90 is zero.

When the conical shaft 50 contacts the seal 90 and the interference amount of the seal 90 is the preset interference amount, there is a contact pressure between the seal 90 and the conical shaft 50. The contact pressure is perpendicular to a contact surface between the conical shaft 50 and the seal 90. A component of the contact pressure in the axial direction of the conical shaft 50 equals to a difference between the second pressure value and the first pressure value of the pressure sensor 30. A component of the contact pressure in the radial direction of the conical shaft 50 is the shaft-holding force at the seal 90. Since the second pressure value and the first pressure value may be obtained through the pressure sensor 30, the component of the contact pressure in the axial direction of the conical shaft 50 may be obtained by calculating the difference between the second pressure value and the first pressure value, and then according to the cone angle of the conical shaft 50, the component of the contact pressure in the radial direction of the conical shaft 50 can be obtained through calculation, and thus the shaft-holding force of the seal 90 can be obtained.

Since the pressure sensor 30 is located outside the test box 80 and the conical shaft 50 is located inside the test box 80, the pressure sensor 30 and the conical shaft 50 may be in different environments, and the pressure sensor 30 is separated from the test box 80 by the adiabatic rod 40, such that the temperature of the test box 80 will not affect the pressure sensor 30, and the pressure sensor 30 can work normally, the available temperature range of the measuring device of the shaft-holding force of the seal is not affected by working temperature requirements of the pressure sensor 30, so that the measuring device of the shaft-holding force of the seal can measure a shaft-holding force when beyond a working temperature range of the pressure sensor 30, and can measure the shaft-holding force of the seal 90 under high or low temperature conditions, thereby widening the testing range of tests of the shaft-holding force of the seal 90.

In addition, when the first diameter L1 of the seal 90 remains unchanged and the preset interference amount is changed, the shaft-holding force of the seal 90 may be measured by adjusting the first distance of the conical shaft 50 moving along the first direction X; when the second diameter L2 of the seal 90 remains unchanged and the preset interference amount is changed, the shaft-holding force of the seal 90 may be measured by adjusting the first distance of the conical shaft 50 moving along the first direction X; when both the first diameter L1 and the second diameter L2 of the seal 90 are changed, and the preset interference amount remains unchanged, the shaft-holding force of the seal 90 may be measured by adjusting the contact position of the conical shaft 50 at the first diameter L1 and the second diameter L2; when both the first diameter L1 and the second diameter L2 of the seal 90 are changed, and the preset interference amount is changed, the shaft-holding force of the seal 90 may be measured by adjusting the contact position of the conical shaft 50 at the first diameter L1 and the second diameter L2, and the first distance of the conical shaft 50 along the first direction X. In this way, the shaft-holding force of the seal 90, under the conditions that at least one of the first diameter L1, the second diameter L2 and the preset interference amount is changed, can be measured by the same conical shaft 50.

In addition, the interference amount of the seal 90 is provided by the conical shaft 50, and the conical shaft 50 moving in the first direction X may change a radial fitting size between the conical shaft 50 and the seal 90, and thus change the interference amount of the seal 90. When the conical shaft 50 moves along the first direction X, and the cone angle of the conical shaft 50 is changed, adjustment time of the shaft diameter of the conical shaft 50 can be changed, and when axial length of the conical shaft 50 is changed, and adjustment range of the shaft diameter of the conical shaft 50 can be changed.

It should be noted that changing the cone angle of the conical shaft 50 may be achieved by replacing the conical shaft 50.

Optionally, as shown in FIG. 1, the conical shaft 50 includes a large diameter end 501 and a small diameter end 502, and the large diameter end 501 is fixedly connected with the adiabatic rod 40.

Where, the cone angle of the conical shaft 50 may be set according to actual requirements. In an optional embodiment, the cone angle of the conical shaft 50 is less than or equal to 10°.

Figure 3:
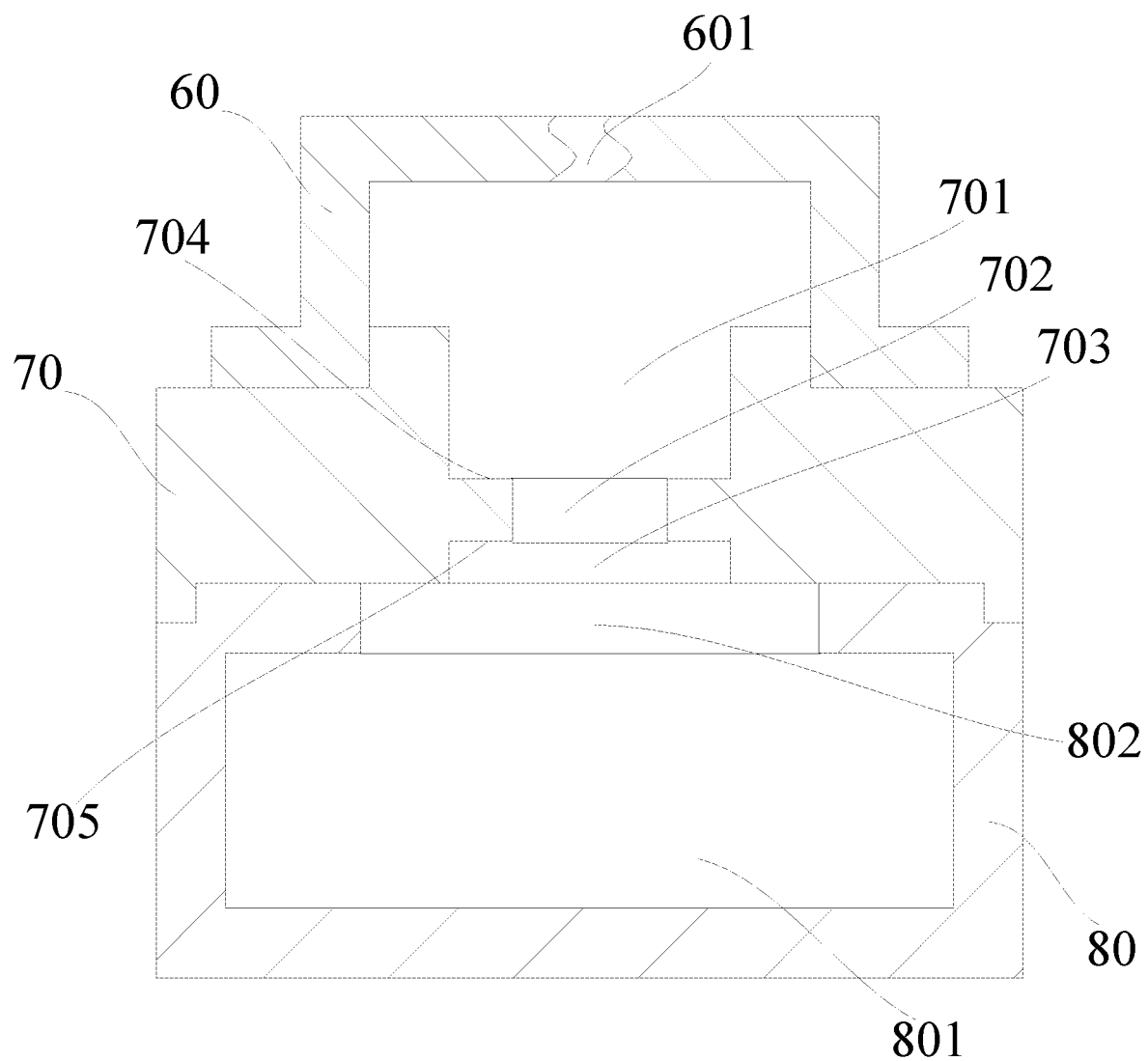
FIG. 3 is a schematic structural diagram of a first support, a second support and a test box in FIG. 1.

FIG. 3 is a structural diagram of the first support, the second support and the test box in FIG. 1.

Optionally, as shown in FIG. 1, the adiabatic rod 40 includes a connection seat 41 and a second pressing plate 42, the connection seat 41 is detachably connected with the second pressing plate 42, the connection seat 41 is connected with the pressure sensor 30, and the second pressing plate 42 is fixedly connected with the large diameter end 501 of the conical shaft 50.

Where, as shown in FIG. 3, the second support 70 is provided with a first cylindrical hole 701, a second cylindrical hole 702 and a third cylindrical hole 703 in sequence along the first direction X. A diameter of the first cylindrical hole 701 is greater than a diameter of the second cylindrical hole 702, and a diameter of the third cylindrical hole 703 is greater than the diameter of the second cylindrical hole 702.

The test box 80 is provided with a cylindrical through hole 802, a diameter of cylindrical through hole 802 is greater than the diameters of the large diameter end 501 of the conical shaft 50 and of the third cylindrical hole 703. After the second support 70 and the test box 80 are detached, the conical shaft 50 may be replaced through the cylindrical through hole 802.

The pressure sensor 30 is located in the first cylindrical hole 701, the connection seat 41 passes through the second cylindrical hole 702, and the second pressing plate 42 is located in the third cylindrical hole 703.

Further, the connection seat 41 includes a connection plate 411 and a guide post 412, the connection plate 411 and the guide post 412 are fixedly connected, the connection plate 411 is fixedly connected with the pressure sensor 30, the connecting plate 411 is located in the first cylindrical hole 701, and the guide post 412 is slidably provided in the second cylindrical hole 702.

The connection plate 411, the guide post 412 and the second pressing plate 42 are all rotational bodies.

The shape of the guide post 412 is cylindrical. An axial direction of the guide post 412 extends along the first direction X, and the guide post 412 is only in contact with the second cylindrical hole 702 in a radial direction of the guide post 412, and there is no pressing force between the guide post 412 and the second cylindrical hole 702 in the radial direction of the guide post 412. The second cylindrical hole 702 plays a guiding role in the sliding process of the guide post 412.

A first step 704 is set in the first cylindrical hole 701, a second step 705 is set in the third cylindrical hole 703, the connection plate 411 may abut against the first step 704, and the second pressing plate 42 may abut against the second step 705. In this way, the adiabatic rod 40 will not be separated from the second cylindrical hole 702 during the movement of the adiabatic rod 40 along the first direction X.

It should be noted that the pressure sensor 30 will not be in contact with the second support 70 when moving along the first direction X.

Optionally, as shown in FIG. 1, the drive assembly 10 includes a hand wheel 11 and a lead screw 12, the lead screw 12 passes through the first support 60, the hand wheel 11 and the first pressing plate 20 are fixed at two ends of the lead screw 12 respectively, and the lead screw 12 extends along the first direction X.

Where, the first support 60 is provided with a threaded hole 601 matched with the lead screw 12.

A moving distance of the conical shaft 50 in the first direction X is a moving distance of the lead screw 12 in the first direction X, and the moving distance of the lead screw 12 in the first direction X may be converted into the number of rotations of the lead screw 12, the number of rotations of the lead screw 12 is the number of rotations of the hand wheel 11. The moving distance of the conical shaft 50 in the first direction X may be achieved by the number of rotations of the hand wheel 11.

When measuring the shaft-holding force of the seal 90, the hand wheel 11 is first moved to make the conical shaft 50 move along the first direction X, and the conical shaft 50 is in contact with the seal 90 during the movement, and at this time, the interference amount of the seal 90 is zero, the diameter of the seal 90 is the first diameter L1, and the pressure value of the pressure sensor 30 is the first pressure value; the number of rotation of the hand wheel 11 corresponds to the first distance, so that the conical shaft 50 compresses the seal 90, the interference amount of the seal 90 is the preset interference amount, and the pressure value of the pressure sensor 30 is the second pressure value.

Figure 4:
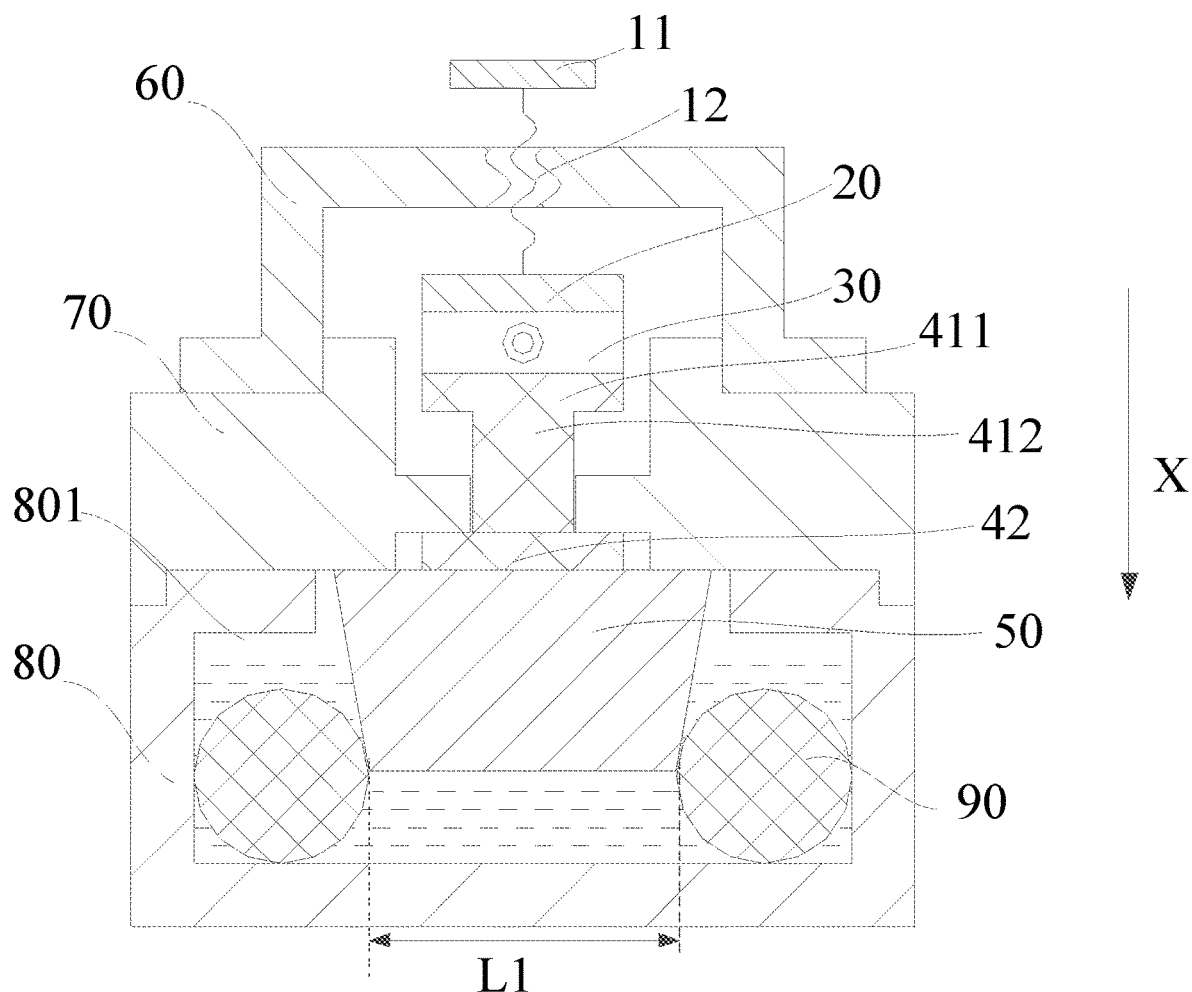
FIG. 4 is a schematic structural diagram of another measuring device for a shaft-holding force of a seal according to an embodiment of the present disclosure.

FIG. 4 is a schematic structural diagram of another measuring device for a shaft-holding force of a seal provided by an embodiment of the present disclosure.

Optionally, as shown in FIG. 4, the test chamber 801 is internally provided with a high-temperature fluid medium or a low-temperature fluid medium. This setting can not only simulate the working temperature of the seal 90 under high or low temperature conditions, but also simulate the working environment of the seal 90 under high or low temperature conditions.

An embodiment of the present disclosure provides a measuring method for a shaft-holding force of a seal, including:

simulating a working temperature of the seal 90 through a test box 80, where specifically, by heating or cooling the test box 80, the working temperature of the seal 90 can be simulated;

placing the seal 90 and the conical shaft 50 into the test chamber 801, where the seal 90 is not in contact with the conical shaft 50, and the interference amount of the seal 90 is zero, and specifically, before measuring the shaft-holding force of the seal 90, the drive assembly 10 supports the first pressing plate 20, the pressure sensor 30, the adiabatic rod 40 and the conical shaft 50, so that the conical shaft 50 is not in contact with the seal 90, and at this time, the interference amount of the seal 90 is zero, the diameter of the seal 90 is the first diameter, and the pressure value of the pressure sensor 30 is the first pressure value;

driving, by the drive assembly 10, the first pressing plate 20, the pressure sensor 30, the insulting rod 40 and the conical shaft 50 to move along a first direction X, and compressing, by the conical shaft 50, the interference amount of the seal 90 to a preset interference amount, the movement process of conical shaft 50 may refer to the movement process of the conical shaft 50 in the measuring device for a shaft-holding force of a seal, and will not be specifically described here;

obtaining, by the pressure sensor 30, a pressure value when the interference amount of the seal 90 is the preset interference amount, where specifically, when the interference amount of the seal 90 is the preset interference amount, the pressure value of the pressure sensor 30 is the second pressure value;

calculating the shaft-holding force of the seal 90 according to the pressure value obtained by the pressure sensor 30 and the cone angle of the cone shaft 50, where the calculation process of the shaft-holding force of the seal 90 may refer to the calculation process of the shaft-holding force of the seal 90 in the measuring device of the shaft-holding force of the seal, and will not be specifically described here.

Finally, it should be noted that the above embodiments are only used to illustrate the technical solutions of the present disclosure, but not to limit them; although the present disclosure has been described in detail with reference to the preceding embodiments, those skilled in the art should understand that they can still modify the technical solutions recited in the preceding embodiments, or conduct equivalent replacement of some or all of the technical features therein; however, these modifications or replacements do not make the essence of the corresponding technical solutions deviate from the scope of the technical solutions of the embodiments of the present disclosure.

What is claimed is:

1. A measuring device for a shaft-holding force of a seal, comprising a drive assembly, a first pressing plate, a pressure sensor, an adiabatic rod, a conical shaft, a first support, a second support, a test box and a seal;
the first support is fixed to the second support, the second support is fixed to the test box, the test box comprises a test chamber, the conical shaft and the seal are located in the test box, the seal is set on the test chamber, the seal is in contact with an inner wall of the test box, the pressure sensor is located outside the test box, the adiabatic rod slidably passes through the second support, and the pressure sensor and the conical shaft are respectively fixed at two ends of the adiabatic rod;
the drive assembly is installed to the first support, the drive assembly is fixedly connected with the first pressing plate, the first pressing plate is fixedly connected with the pressure sensor, and the drive assembly is used to move the first pressing plate, the pressure sensor, the adiabatic rod and the conical shaft along a first direction, and the conical shaft is used to compress an interference amount of the seal to a preset interference amount during movement in the first direction;
wherein the adiabatic rod is made of a thermal insulation material.

2. The measuring device for a shaft-holding force of a seal according to claim 1, wherein the conical shaft comprises a large diameter end and a small diameter end, and the large diameter end is fixedly connected with the adiabatic rod.

3. The measuring device for a shaft-holding force of a seal according to claim 2, wherein the adiabatic rod comprises a connection seat and a second pressing plate, the connection seat and the second pressing plate are detachably connected to each other, the connection seat is connected with the pressure sensor, and the second pressing plate is fixedly connected with the large diameter end of the conical shaft.

4. The measuring device for a shaft-holding force of a seal according to claim 3, wherein the second support is provided with a first cylindrical hole, a second cylindrical hole and a third cylindrical hole arranged in sequence along the first direction, a diameter of the first cylindrical hole is greater than a diameter of the second cylindrical hole, and a diameter of the third cylindrical hole is greater than the diameter of the second cylindrical hole;
the test box is provided with a cylindrical through hole, a diameter of the cylindrical through hole is greater than a diameter of the large diameter end of the conical shaft and the diameter of the third cylindrical hole; the pressure sensor is located in the first cylindrical hole, the connection seat passes through the second cylindrical hole, and the second pressing plate is located in the third cylindrical hole.

5. The measuring device for a shaft-holding force of a seal according to claim 4, wherein the connection seat comprises a connection plate and a guide post, the connection plate is fixedly connected with the guide post, the connection plate is fixedly connected with the pressure sensor, the connection plate is located in the first cylindrical hole, and the guide post is slidably arranged in the second cylindrical hole;
a first step is provided in the first cylindrical hole, a second step is provided in the third cylindrical hole, the connection plate abuts against the first step, and the second pressing plate abuts against the second step.

6. The measuring device for a shaft-holding force of a seal according to claim 5, wherein the seal is a circular seal, the seal has a first diameter when the interference amount of the seal is zero, and the seal has a second diameter when the interference amount of the seal is the preset interference amount.

7. The measuring device for a shaft-holding force of a seal according to claim 5, wherein the test chamber is internally provided with a high-temperature fluid medium or a low-temperature fluid medium.

8. The measuring device for a shaft-holding force of a seal according to claim 4, wherein the seal is a circular seal, the seal has a first diameter when the interference amount of the seal is zero, and the seal has a second diameter when the interference amount of the seal is the preset interference amount.

9. The measuring device for a shaft-holding force of a seal according to claim 4, wherein the test chamber is internally provided with a high-temperature fluid medium or a low-temperature fluid medium.

10. The measuring device for a shaft-holding force of a seal according to claim 3, wherein the seal is a circular seal, the seal has a first diameter when the interference amount of the seal is zero, and the seal has a second diameter when the interference amount of the seal is the preset interference amount.

11. The measuring device for a shaft-holding force of a seal according to claim 3, wherein the test chamber is internally provided with a high-temperature fluid medium or a low-temperature fluid medium.

12. The measuring device for a shaft-holding force of a seal according to claim 2, wherein the seal is a circular seal, the seal has a first diameter when the interference amount of the seal is zero, and the seal has a second diameter when the interference amount of the seal is the preset interference amount.

13. The measuring device for a shaft-holding force of a seal according to claim 2, wherein the test chamber is internally provided with a high-temperature fluid medium or a low-temperature fluid medium.

14. The measuring device for a shaft-holding force of a seal according to claim 1, wherein the driving assembly comprises a hand wheel and a lead screw, the lead screw passes through the first support, the hand wheel and the first pressing plate are fixed at two ends of the lead screw respectively, and the lead screw extends along the first direction.

15. The measuring device for a shaft-holding force of a seal according to claim 14, wherein the first support is provided with a threaded hole matching with the lead screw.

16. The measuring device for a shaft-holding force of a seal according to claim 15, wherein the seal is a circular seal, the seal has a first diameter when the interference amount of the seal is zero, and the seal has a second diameter when the interference amount of the seal is the preset interference amount.

17. The measuring device for a shaft-holding force of a seal according to claim 14, wherein the seal is a circular seal, the seal has a first diameter when the interference amount of the seal is zero, and the seal has a second diameter when the interference amount of the seal is the preset interference amount.

18. The measuring device for a shaft-holding force of a seal according to claim 1, wherein the seal is a circular seal, the seal has a first diameter when the interference amount of the seal is zero, and the seal has a second diameter when the interference amount of the seal is the preset interference amount.

19. The measuring device for a shaft-holding force of a seal according to claim 1, wherein the test chamber is internally provided with a high-temperature fluid medium or a low-temperature fluid medium.

20. A measuring method for a shaft-holding force of a seal using the measuring device for a shaft-holding force of a seal according to claim 1, comprising:
- simulating, by the test box, a working temperature of the seal;
- placing the seal and conical shaft into the test chamber, wherein the seal is not in contact with the conical shaft, and the interference amount of the seal is zero;
- moving, by the driving assembly, the first pressing plate, the pressure sensor, the adiabatic rod and the conical shaft move in the first direction, and compressing, by the conical shaft, the interference amount of the seal to the preset interference amount;
- obtaining, by the pressure sensor, a pressure value when the interference amount of the seal is the preset interference amount;

calculating the shaft-holding force of the seal according to the pressure value obtained by the pressure sensor and a cone angle of the conical shaft.

* * * * *